Figure 1:
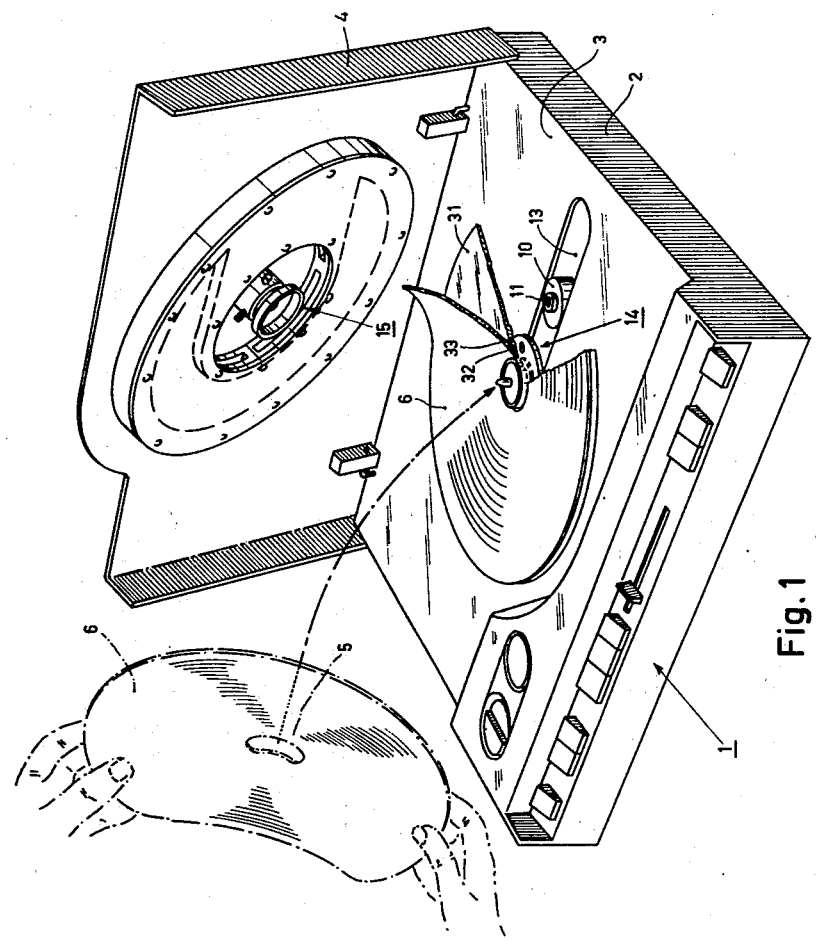

United States Patent [19]

Lakerveld et al.

[11] 4,060,248

[45] Nov. 29, 1977

[54] PLAYING APPARATUS, IN PARTICULAR A VIDEO PLAYER FOR PLAYING A RECORD WHICH IS MADE OF A TRANSPARENT MATERIAL AND PROVIDED WITH A CENTRAL HOLE

[75] Inventors: Herman Gerard Lakerveld; Gerard Eduard van Rosmalen; Kornelis Bulthius; Johannes Petrus Sinjou, all of Eindhoven, Netherlands

[73] Assignee: U.S. Philips Corporation, New York, N.Y.

[21] Appl. No.: 583,987

[22] Filed: June 5, 1975

[30] Foreign Application Priority Data

Mar. 12, 1975 Netherlands .................... 7502416

[51] Int. Cl.$^2$ ........................... G11B 7/24; H04N 1/28
[52] U.S. Cl. ........................... 274/41.6 R; 358/128
[58] Field of Search ..................... 274/9 R, 9 B, 39 R, 274/39 A, 41.6 R, 41.6 A, 42 R; 360/97, 99, 86; 178/6.6 R, 6.6 DD, 6.7 A, 1.3 B; 346/137; 179/100.3 G; 358/128

[56] References Cited

U.S. PATENT DOCUMENTS

| | | | |
|---|---|---|---|
| 2,416,135 | 2/1947 | Appleby | 274/39 R |
| 3,249,006 | 5/1966 | Stauffer | 353/101 |
| 3,825,323 | 7/1974 | Landwer | 346/137 |
| 3,863,266 | 1/1975 | Hoshino | 360/86 |
| 3,924,063 | 12/1975 | Simons | 358/128 |

*Primary Examiner*—Steven L. Stephan
*Attorney, Agent, or Firm*—Frank R. Trifari; Simon L. Cohen

[57] ABSTRACT

A playing apparatus, more specifically a video player for playing round records with a central hole, which are made of a transparent material, which records at one side have a transparent surface and at their other side are provided with information tracks which are optically readable with the aid of a read beam, which tracks are covered by a light-reflecting layer. In order to enable both relatively thick rigid records and relatively thin flexible records to be played on one playing apparatus, the invention provides a transparent adapter disc, which together with a flexible record can be positioned on the playing apparatus and driven in a rotary fashion. In order to prevent dust particles from being trapped between the flexible record and the transparent adapter disc, the adapter disc may be provided with a central recess with a number of air admission apertures at the circumference thereof, so that during operation a thin film of air is formed between the flexible record and the adapter disc.

2 Claims, 4 Drawing Figures

PLAYING APPARATUS, IN PARTICULAR A VIDEO PLAYER FOR PLAYING A RECORD WHICH IS MADE OF A TRANSPARENT MATERIAL AND PROVIDED WITH A CENTRAL HOLE

The invention relates to a playing apparatus, in particular a video player, for playing a round record which is made of a transparent material and provided with a central hole, which record comprises a transparent surface at one side and at its other side a surface which is provided with information tracks, which are optically readable with a read beam derived from a light source and which consist of local recesses in or elevations on the surface, and disposed thereon a light reflecting layer for reflecting the read beam, and comprising: a housing with a substantially flat covering plate, a motor driven drive spindle which projects from the housing for rotating the record parallel to the covering plate, accommodated in the housing an optical focussing device which is radially movable relative to the drive spindle for projecting the read beam on the information tracks through the transparent side of the record and for receiving the reflected light beam which is modulated by the information, and is substantially adapted to co-operate with a rigid record of a specific standard thickness, as well as a record clamping device which comprises a record support which co-operates with said rigid record outside the range of the information tracks and near the central hole, and a resiliently loaded record device which also co-operates with the record near the central hole.

Such a video player is known and has been demonstrated to interested parties by the Applicant on several occasions. In this known video player the housing accommodates a light source in the form of a laser which via a number of optical means emits a light beam towards the focussing device which is mounted on a carriage which is radially movable relative to the covering plate. The focussing device, i.e. the objective thereof, is thus radially movable relative to the side of a video record disposed on the clamping device which faces the covering plate. Hereinafter said side of the record will be referred to as lower surface. The light beam is projected onto the lower surface of the record by the objective, then transverses, the transparent record and is focussed on the information tracks which are disposed at the upper record surface. After reflection by the light reflecting layer which is provided at the upper surface of the record, the light beam which is reflected and modulated by the information contained on the record returns through the transparent material of the record and the air between the record and the objective to the optical system of the record player, where it is separated from the onward beam in a suitable manner after which a conversion from light beam modulation into electrical modulation takes place. The record support, which forms part of the record clamping device, takes the form of a flange which is disposed on the drive spindle, which flange has a diameter which is smaller than the diameter at which the information tracks nearest to the central hole are located.

The use of such a video player for playing video records which are made of a thin flexible foil presents various problems. First of all damaging of the flexible record during revving up is difficult to prevent. When the record is arranged on the record support it will sag owing to its low lateral rigidity and will consequently come into contact with the covering plate of the housing. During operation the record player imparts a speed of 1500 or 1800 revolutions per minute to the record. At this speed contact of the flexible record with the covering plate of the housing or other parts of the machine is no longer likely, because under the influence of the centrifugal forces which act on the record it is straightened in a plane transverse to the axis of the drive spindle. Hence, the record is likely to be damaged during revving up of the record and also during slowing down.

A further problem is presented by the fact that owing to the smaller depth of the transparent material of the record the optical pathlength of the read beam is altered.

It is an object of the invention to provide a playing apparatus of the type mentioned in the preamble which is both suitable for playing rigid records and flexible records, and the invention is characterized in that for playing thin records which are made of a flexible foil the record support also comprises a detachable transparent plane-parallel adapter disc with a central hole and having a thickness and a refractive index which is sufficient to substantially remove the spherical aberration produced by the difference in thickness between the rigid disc and the thin flexible disc, and furthermore having a diameter which at least substantially equals that of the flexible record.

The transparent adapter disc supports the flexible foil, so that it can never, not even during stoppage, come into contact with the covering plate of the housing. For the focussing device the optical pathlength remains substantially the same and the transparent disc constitutes no impediment. Arranging the adapter disc on the clamping device need not present any problem, as it can be clamped in the same way as a video record. During revving up of the combination of adapter disc and video record the air which is disposed between the two discs is moved towards the outer periphery of the discs, so that a reduced pressure is obtained between the two discs. As a result, a smooth engagement can be obtained between the two discs so that the two discs rotate as a single rigid disc. A clamping device which produces the same effect is known per se from U.S. Pat. No. 3,729,720. However, this does not relate to an adapter disc which can be disposed separately on a drive spindle, but to a turntable for supporting a magnetic disc which is made of a very thin foil.

In the case of a snug engagement of the flexible video record against the adapter disc problems may occur in reading the video information owing to dust particles being trapped between the video record and the adapter disc and which may thus give rise to local bulging of the video record. Since for a correct reading it is necessary that the distance of the information tracks to the focussing device remains constant down to a fraction of a micron, an embodiment of an adapter disc may be of interest in which trapping of dust particles between the two discs is prevented, and which is characterized in that near the central hole of the adapter disc a recessed portion is formed concentric therewith and that around the recessed portion a number of passing-through air admission apertures are situated for admitting, during operation, air between the flexible record to be played and the plane-parallel surface of the adapter disc which faces said record. From German Offenlegungsschrift 2,407,416 it is known per se to form a layer of air between a rotated flexible video record and a rotating platter in a similar manner. However, this concerns an application of a different nature. In this known apparatus the information contained on the record is read with the aid of a mechanical scanner, viz. from the top. The video record and the platter are each driven, in the same or in opposite directions, the air cushion produced between the two rotating parts serving specifically to allow deformation of the flexible foil by the mechanical scanning element.

The invention will now be described in more detail with reference to the drawing. In the drawing FIG. 1 shows a perspective view of a video player, which is equipped with a clamping device which has been previously described in the Applicant's previous Application Ser. No. 583,988, filed June 5, 1975 and now U.S. Pat. No. 3,980,308, a transparent supporting disc and a flexible video record being disposed on the record support, which are both partly cut away.

Figure 2:
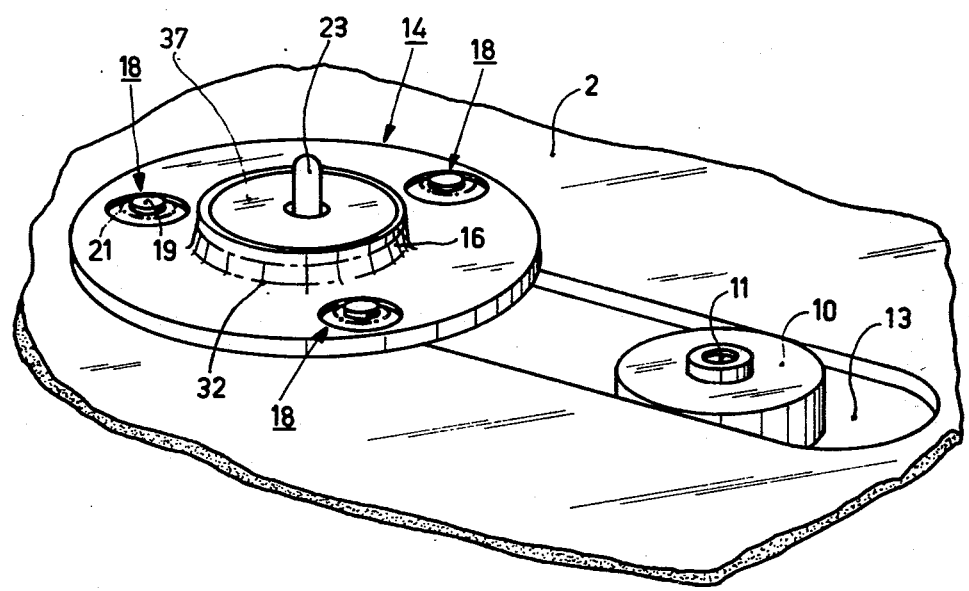
Figure 3:
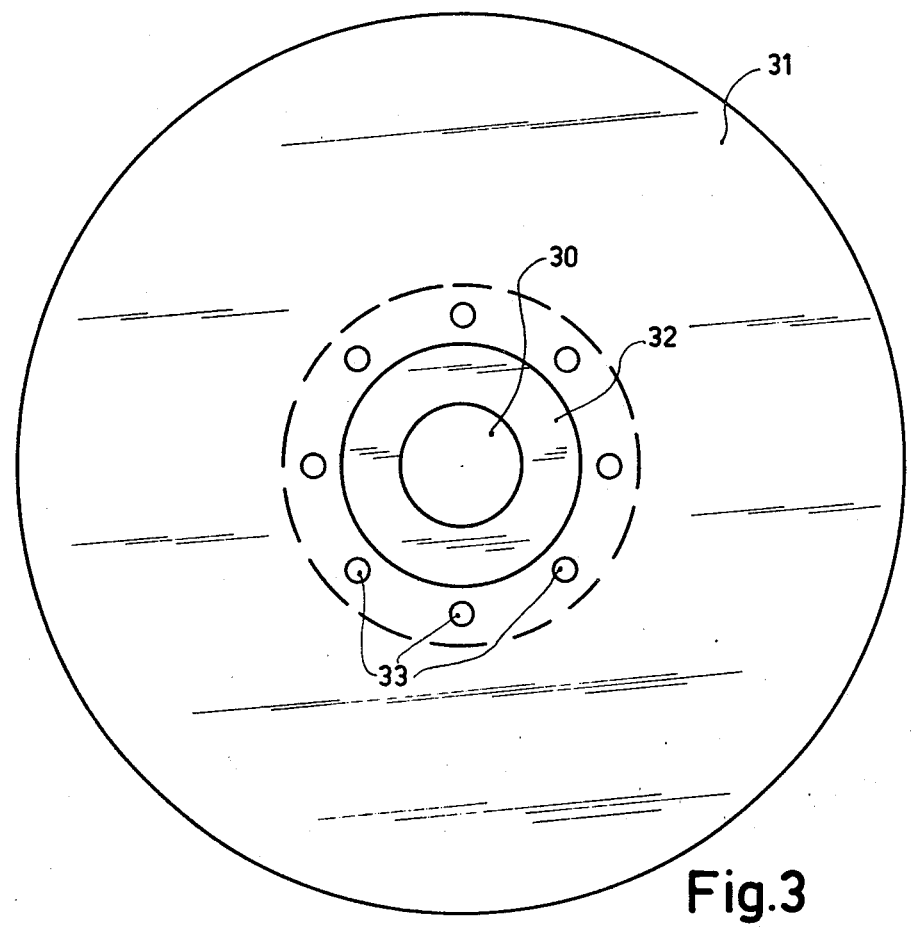
Figure 4:
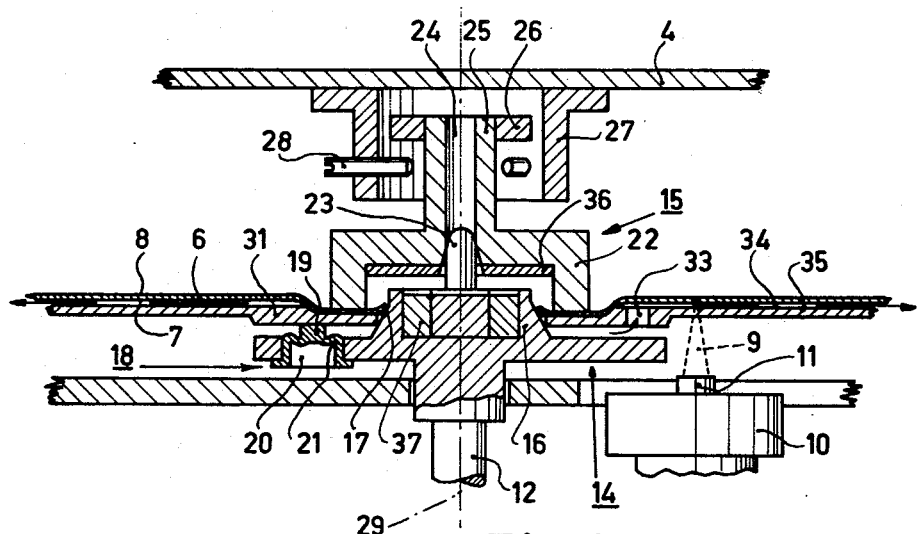

FIG. 2 shows a scaled-up perspective view of the record support of the video player of FIG. 1, FIG. 3 is a top plan view of an embodiment of an adapter disc, and FIG. 4 is a scaled-up cross-section of the record clamping device with closed cover and with an adapter disc and a flexible video record arranged on it.

The playing apparatus 1 of FIG. 1 comprises a housing 2 with a substantially flat covering plate 3 and a cover 4 which is hinged to the housing 2. The player serves for playing round video records 6 which are provided with a central hole 5 and are made of a transparent material. Such records comprise a transparent surface 7 at one side, which surface when the record is disposed on the video player faces the covering plate 3. At its other side the record has a surface 8 on which the information is provided in the form of local recesses and/or elevations, as well as a light-reflecting layer. Said last-mentioned layer is too thin to be shown in the drawing.

By means of a light source, not shown, a read beam 9 can be projected via a focussing device 10 with an objective 11 through the transparent surface 7 onto the surface 8 and the reflected beam can be returned to the information detection means which are located in the housing.

A motor-driven spindle 12 extends from the housing 2 for rotating the video record 6 parallel to the covering plate. The optical focussing device 10 is radially movable in the housing relative to the drive spindle in a slot 13. Said focussing device is adapted to co-operate with a rigid video record having a thickness of approximately 1.1 mm.

A record clamping device which is disposed on the drive spindle comprises a record support 14 which co-operates with a rigid record near its central hole beyond the range of the information tracks. In addition to the record support 14 said clamping device also comprises a resiliently-loaded record loading device 15 which co-operates with the record near the central hole and which forms the subject of the Applicant's previously filed Patent Application Ser. No. 583,988. On the flange-shaped record support 14 a conical centering member 16 is situated whose centering surface 17 has a diameter which varies from smaller than the central hole of a video record to a diameter greater than the central hole. When a rigid record is in position it may be tilted slightly relative to the record support 14. Farther towards the outside three record carrying members 18 are disposed in the flange 14, which comprise a friction block 19 which is integral with the plastic ring 20 and which is connected thereto by means of a resilient and flexible portion 21. The record loading device 15 comprises a pressure ring 22 which when the cover is closed, see FIG. 4, is magnetically loaded in the direction of the record support 14. For this purpose, an annular permanent magnet 37 is disposed in the center of the record support and a soft-iron plate 36 in the record loading device. The record loading device 15 is positioned relative to the spindle 12 by means of a locating pin 23 on the drive spindle and a corresponding hole 24 in the record loading device. This hole is located in a cylindrical portion 25 which comprises a flange 26 at its top. Said flange is disposed inside a bushing 27 which is suitably connected to the cover 4. Three screws 28 retain the record loading device when the cover is opened, but both these screws and the bushing 27 itself leave the record loading device 15 completely free when the cover is closed. With the aid of the clamping device described a video player is obtained on which rigid records can be positioned in a manner which is easy for the user and fully in accordance with the manner in which a grammophone record is positioned on the turntable of a grammophone. An oblique position of the record on the centering member 16 presents no problems. As the video record revs up it will align itself accurately perpendicular to the axis 29 of the drive spindle 12 under the influence of the centrifugal forces acting on it. The magnetic force with which the ring 22 of the record loading device bears on the record has been selected so that the friction which occurs between the edge of the central hole of a rigid video record and the centering surface 17 do not impair alignment of the record. The driving force necessary for transmitting the drive torque is provided by the friction blocks 19.

For playing video records 6 which are made of a thin flexible foil the record support 14 also comprises a transparent plane-parallel adapter disc 31 provided with a central hole 30, which is detachable from the centering member 16. Said disc has a thickness substantially equal to the difference between the thickness of a rigid record, and the thickness of the flexible record 6, and a diameter which at least substantially equals that of the record. Near the central hole 30 a recessed part 32 is situated concentric therewith. Around this part a number of air admission apertures 33 are formed, which serve for admitting air between the flexible record to be played and the plane-parellel surface of the adapter disc facing said record during operation.

The operation of the playing apparatus 1 can best be illustrated with the aid of FIGS. 1 to 4. When it is desired to play back a flexible video record, the adapter disc 31 is first positioned on the drive spindle 12 while the cover is open. As previously stated, and as can be derived from FIG. 1, this is a very simple operation, especially because the adapter disc need not be positioned exactly parallel to the covering plate 3 of the housing 2 as has also been discussed hereinbefore, but may be arranged on the centering member 16 in an arbitrary oblique position.

Subsequently, the flexible record 6 is positioned on the adapter disc and the drive spindle 12 with an entirely similar procedure. The cover 4 is closed, so that the record loading device 15 assumes the position of FIG. 4, and the pressure ring presses the video record 6 against the adapter disc 31 in the manner shown. The machine is revved up, the friction blocks 19 and to a considerably smaller extent, the centering member 16 imparting the driving torque to the assembly of adapter disc 31 and video record 6. The air molecules which are located between the video record and the adapter disc will be subject to a centrifugal force and will move in an outward direction. As a result of this, an air gap 34 is obtained between the video record and the adapter disc, to which air is admitted via the apertures 33 and is removed again at the periphery of the video record. The bottom of the recess 32 has been selected to be at such a distance from the upper surface 35 of the adapter disc 31, that an air gap is obtained with a thickness of approx. 0.5 mm, so that dust particles cannot become trapped between the two discs.

The diameter of the central hole 30 of the adapter disc is selected so that when rigid video records with a thickness of for example amply 1 mm are used or when flexible video records of a thickness of for example 0.2 mm are used while both types of video records having a central hole of equal diameter, the optical pathlength for the light bean 9 is substantially the same in both cases. For this, the distance between the plane-parallel surfaces of the adapter disc 31 may be selected to be of the order of magnitude of 1 mm for the given thickness of the two types of video records. The axial distance from the bottom of the central recess 32 to the plane-parallel surface 35 is then also selected to be approx. 1 mm.

What is claimed is:

1. An apparatus for playing a round disc provided with a center hole and a transparent body reflectively encoded with optically readable information on a surface of the transparent body, the apparatus comprising:
   a housing,
   a motor driven drive spindle extending from said housing, p1 optical means mounted in said housing for radial movement with respect to said drive spindle for projecting a light beam through said transparent body of said record to said reflectively encoded surface of said body and for receiving light reflected from the encoded surface and modulated thereby, said optical means being primarily adapted to read a rigid record of a specific standard thickness,
   a detachably mounted plane parallel transparent adapter disc for adapting said apparatus to play relatively thin flexible foil disc records, said adapter disc being provided with a center hole and having a thickness and a refractive index sufficient to substantially remove the spherical aberration produced by the difference in thickness between the rigid disc and the foil disc and having a diameter substantially equal to that of said foil disc, and
   means for tiltably and rotatably mounting said adapter disc on said drive spindle.

2. An apparatus for playing a round disc provided with a center and a transparent body reflectively encoded with optically readable information on a surface of the transparent body, the apparatus comprising:
   a housing,
   a motor driven drive spindle extending from said housing,
   optical means mounted in said housing for radial movement with respect to said drive spindle for projecting a light beam through said transparent body of said record to said reflectively encoded surface of said body and for receiving light reflected from the encoded surface and modulated thereby, said optical means being primarily adapted to read a rigid record of a specific standard thickness,
   a detachably mounted plane parallel transparent adapter disc for adapting said apparatus to play relatively thin flexible foil disc records, said adapter disc being provided with a center hole and having a thickness and a refractive index sufficient to substantially remove the spherical aberration produced by the difference in thickness between the rigid disc and the foil disc and having a diameter substantially equal to that of the foil disc, said adapter disc being further provided with a recessed portion near the center hole and concentric with said center hole and provided with a number of air admission apertures around said recessed portion for admitting air during operation between the foil disc and a plane parallel surface of the adapter disc.

* * * * *

UNITED STATES PATENT AND TRADEMARK OFFICE
CERTIFICATE OF CORRECTION

PATENT NO. : 4060248
DATED : November 29, 1977
INVENTOR(S) : HERMAN GERARD LAKERVELD ET AL It is certified that error appears in the above–identified patent and that said Letters Patent are hereby corrected as shown below:

In the heading, "Priority Data" should be --7502916--

Column 5, line 35, delete "pl";

"optical" starts new paragraph

Signed and Sealed this

Twenty-third Day of May 1978

[SEAL]

Attest:

RUTH C. MASON
Attesting Officer

LUTRELLE F. PARKER
Acting Commissioner of Patents and Trademarks